(12) United States Patent
Struzyna et al.

(10) Patent No.: US 11,087,035 B2
(45) Date of Patent: Aug. 10, 2021

(54) SYSTEM AND METHOD FOR DETECTION AND SIMULATION OF BUILDING MODELS

(71) Applicant: Trimble Inc., Sunnyvale, CA (US)

(72) Inventors: Markus Struzyna, Sankt Augustin (DE); Georg Hewelt, Bucholz (DE)

(73) Assignee: Trimble Inc., Sunnyvale, CA (US)

( * ) Notice: Subject to any disclaimer, the term of this patent is extended or adjusted under 35 U.S.C. 154(b) by 445 days.

(21) Appl. No.: 16/023,248

(22) Filed: Jun. 29, 2018

(65) Prior Publication Data
US 2020/0004900 A1    Jan. 2, 2020

(51) Int. Cl.
G06F 30/13    (2020.01)

(52) U.S. Cl.
CPC ..................... *G06F 30/13* (2020.01)

(58) Field of Classification Search
CPC .. G06F 17/5004; G06F 2111/10; G06F 30/13; G06T 17/00; G06T 2210/04; G06T 2210/56
USPC ........................................................... 703/1
See application file for complete search history.

(56) References Cited

PUBLICATIONS

Wang, Chao, Yong K. Cho, and Changwan Kim. "Automatic BIM component extraction from point clouds of existing buildings for sustainability applications." Automation in Construction 56 (2015): 1-13.*

Raumonen, Pasi, et al. "Fast automatic precision tree models from terrestrial laser scanner data." Remote Sensing 5.2 (2013): 491-520.*

Anagnostopoulos, Ioannis, Michael Belsky, and Ioannis Brilakis. "Object boundaries and room detection in as-is bim models from point cloud data." Proceedings of the 16th International Conference on Computing in Civil and Building Engineering, Osaka, Japan. 2016.*

Koska, B., and T. Kremen. "The combination of laser scanning and structure from motion technology for creation of accurate exterior and interior orthophotos of St. Nicholas Baroque church." Int. Arch. Photogramm. Remote Sens. Spat. Inf. Sci 40 (2013): 133-138.*

Copy of International Search Report and Written Opinion for Application No. PCT/US2019/037725 dated Sep. 27, 2019, 16 pages.

(Continued)

*Primary Examiner* — Justin C Mikowski
(74) *Attorney, Agent, or Firm* — Kilpatrick Townsend & Stockton

(57) ABSTRACT

Systems and methods for automatically simulating a building model. A method may include defining a plurality of space bodies, each of the plurality of space bodies representing a non-overlapping volume within a building. The method may also include determining a plurality of gaps between the plurality of space bodies. The method may further include obtaining a set of geometric rules that define simulation parameters as a function of the plurality of gaps. The method may further include generating a plurality of simulation parameters by evaluating the plurality of gaps against the set of geometric rules. The method may further include applying the simulation parameters to a sequence of simulation conditions to produce a simulation result.

20 Claims, 9 Drawing Sheets

(56) References Cited

PUBLICATIONS

Previtali, M., et al., "A Flexible Methodology for Outdoor/Indoor Building Reconstruction From Occluded Point Clouds," ISPRS Annals of the Photogrammetry, Remote Sensing and Spatial Information Sciences, vol. II-3, 2014, ISPRS Technical Commission III Symposium, Sep. 5-7, 2014, Zurich, Switzerland, pp. 119-126.

Yan, F., et al., "Block Assembly for Global Registration of Building Scans," ACM Trans. Graph., vol. 35, No. 6, Article 237, Publication Date: Nov. 2016, 11 pages.

Cianfrone, C., "Thermal Performance of Three-Dimensional Building Envelope Assemblies and Details for Improving the Accuracy of Whole Building Performance Simulation," SimBuild, 2012, Fifth National Conference of IBPSA—USA, Madison, Winconsin, Aug. 1-3, 2012, pp. 83-95.

\* cited by examiner

140A

140B

| Gap Thickness | Gap Angle | Gap Height | Simulation Parameter (Thermal Conductivity) |
|---|---|---|---|
| 0 mm – 3 mm | - | - | $3 \times 10^{-2}$ W/(m×K) |
| 3 mm – 30 mm | - | - | $2 \times 10^{-1}$ W/(m×K) |
| 30 mm – 55 mm | - | - | $8 \times 10^{-2}$ W/(m×K) |
| 55 mm – 57 mm | - | - | $6 \times 10^{0}$ W/(m×K) |
| 57 mm – 80 mm | 0° – 15° or 165° – 180° | - | $3 \times 10^{-1}$ W/(m×K) |
| 57 mm – 80 mm | 15° – 165° | 0 m – 10 m | $6.1 \times 10^{-1}$ W/(m×K) |
| 57 mm – 80 mm | 15° – 165° | 10 m – 100 m | $6.2 \times 10^{-2}$ W/(m×K) |
| 80 mm – 140 mm | - | 0 m – 5 m | $3 \times 10^{-1}$ W/(m×K) |
| 80 mm – 140 mm | - | 5 m – 100 m | $3.2 \times 10^{-1}$ W/(m×K) |
| 140 mm – 300 mm | - | - | $3 \times 10^{-2}$ W/(m×K) |

FIG. 5

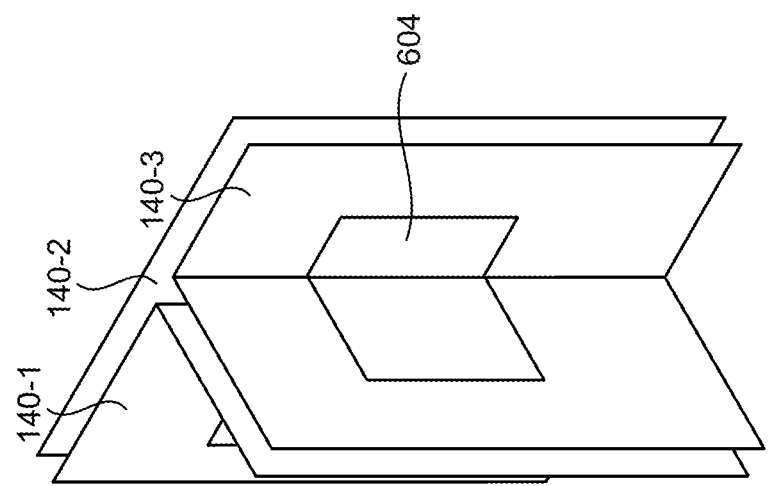
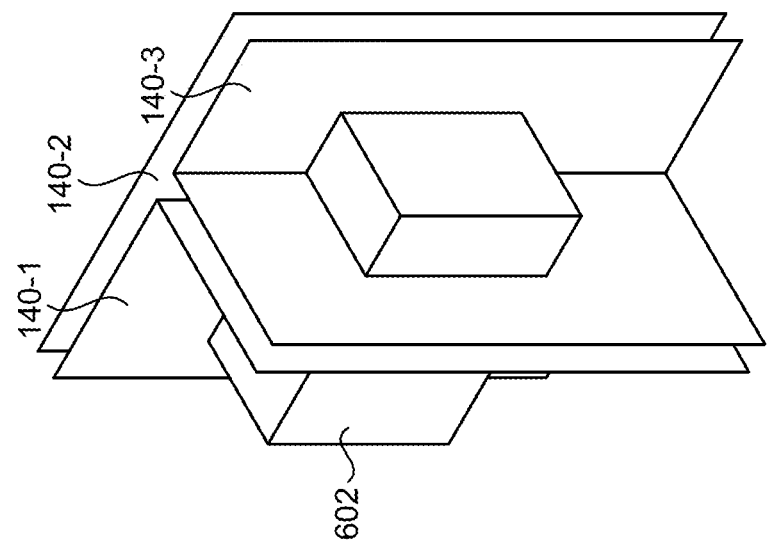
FIG. 6

| Gap Thickness 702 | Gap Angle 704 | Gap Height 706 | Modifying Body 708 | Simulation Parameter (Thermal Conductivity) 710 |
|---|---|---|---|---|
| 0 mm – 3 mm | - | - | - | $3 \times 10^{-2}$ W/(m×K) |
| 3 mm – 30 mm | - | - | - A | $2 \times 10^{-1}$ W/(m×K) <br> $1 \times 10^{-1}$ W/(m×K) |
| 30 mm – 55 mm | - | - | - A | $8 \times 10^{-2}$ W/(m×K) <br> $4 \times 10^{-2}$ W/(m×K) |
| 55 mm – 57 mm | - | - | - A | $6 \times 10^{0}$ W/(m×K) <br> $3 \times 10^{0}$ W/(m×K) |
| 57 mm – 80 mm | 0° – 15° or 165° – 180° | 0 m – 10 m | - A | $3 \times 10^{-1}$ W/(m×K) <br> $1.3 \times 10^{-1}$ W/(m×K) |
| | 15° – 165° | 10 m – 100 m | - A | $6.1 \times 10^{-1}$ W/(m×K) <br> $2.7 \times 10^{-1}$ W/(m×K) |
| 80 mm – 140 mm | - | 0 m – 5 m | - A | $6.2 \times 10^{-2}$ W/(m×K) <br> $2.5 \times 10^{-2}$ W/(m×K) |
| | | 5 m – 100 m | - A | $3 \times 10^{-1}$ W/(m×K) <br> $1.5 \times 10^{-1}$ W/(m×K) |
| 140 mm – 300 mm | - | - | - A | $3.2 \times 10^{-1}$ W/(m×K) <br> $1.6 \times 10^{-1}$ W/(m×K) |
| | | | | $3 \times 10^{-2}$ W/(m×K) <br> $1.5 \times 10^{-2}$ W/(m×K) |

FIG. 7

SYSTEM AND METHOD FOR DETECTION AND SIMULATION OF BUILDING MODELS

BACKGROUND

Calculations and simulations of building models typically require the manual creation of each architectural part using a computer-aided design (CAD) or computer-aided engineering (CAE) system followed by a manual assignment of one or more technical calculation parameters to the architectural parts. As such, each wall, slab, and ceiling has to be brought manually into the CAD/CAE system and each of the architectural part's parameters such as heat transmission, working load limits etc. need to be specified and associated to the architectural part directly. The traditional approach is time consuming and is prone to errors. Accordingly, new systems, methods, and other techniques for simulating building models are needed.

SUMMARY

In a first aspect of the present invention, a method for automatically simulating a building model is provided. The method may include defining a plurality of space bodies. In some embodiments, each of the plurality of space bodies represents a non-overlapping volume within a building. The method may also include determining a plurality of gaps between the plurality of space bodies. The method may further include obtaining a set of geometric rules that define simulation parameters as a function of the plurality of gaps. The method may further include generating a plurality of simulation parameters by evaluating the plurality of gaps against the set of geometric rules. The method may further include applying the simulation parameters to a sequence of simulation conditions to produce a simulation result.

In some embodiments, the method further includes receiving an interior point cloud from a first scanning machine, the interior point cloud having been generated by the first scanning machine by scanning at least one room of the building, and receiving an exterior point cloud from a second scanning machine, the exterior point cloud having been generated by the second scanning machine by scanning an exterior of the building. In some embodiments, the plurality of space bodies is defined using the interior point cloud and the exterior point cloud. In some embodiments, the first scanning machine and the second scanning machine are different scanning machines. In some embodiments, the simulation parameters are thermal simulation parameters and the simulation result is a thermal simulation result. In some embodiments, the method further includes defining a modifying body. In some embodiments, the modifying body represents a volume that overlaps with at least one of the plurality of gaps, and the set of geometric rules define simulation parameters as a function of the plurality of gaps and as a function of the modifying body. In some embodiments, the method further includes receiving an existing building model. In some embodiments, the plurality of space bodies is defined by analyzing the existing building model. In some embodiments, the simulation conditions specify one or more of: a starting time of a simulation, an ending time of the simulation, a length of the simulation, a subset of the plurality of space bodies to be included in the simulation, and a subset of the plurality of gaps to be included in the simulation.

In a second aspect of the present invention, a system for automatically simulating a building model is provided. In some embodiments, the system includes one or more processors and a non-transitory computer-readable medium comprising instructions that, when executed by the one or more processors, cause the one or more processors to perform operations corresponding to the method described in reference to the first aspect of the present invention.

In a third aspect of the present invention, a non-transitory computer-readable medium for automatically simulating a building model is provided. In some embodiments, the non-transitory computer-readable medium includes instructions that, when executed by a processor, cause the processor to perform operations corresponding to the method described in reference of the first aspect of the present invention.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

FIG. 5 illustrates a table containing an example of a set of geometric rules.

FIG. 6 illustrates the interaction between a modifying body that overlaps with at least one of a plurality of space bodies and/or a plurality of gaps.

FIG. 7 illustrates a table containing an example of a set of geometric rules.

Figure 1:
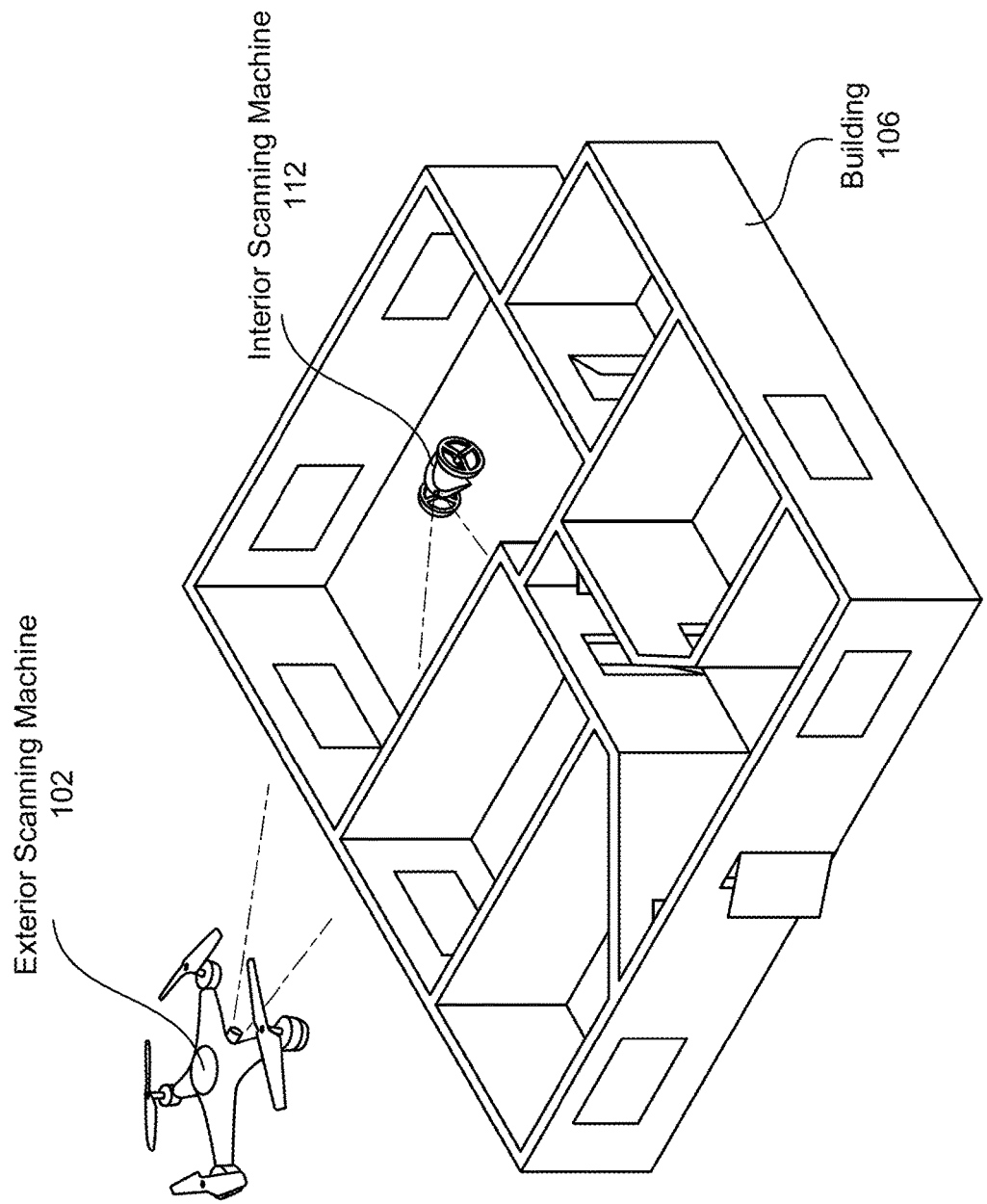
FIG. 1 illustrates a building that is to be modeled and simulated using embodiments of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Traditional calculations and simulations of building models require the manual creation of each architectural part followed by a manual assignment of technical calculation parameters to each architectural part. There are several deficiencies associated with the existing approach, the most noteworthy being the limited simulation accuracy of such simulated building models. Embodiments of the present invention include an innovative way of generating a building model of a building without considering the architectural elements of the building explicitly. Instead, embodiments of the present invention focus on rooms and the rooms' faces by applying rule systems to assign simulation parameters to gaps between rooms. This allows the assignment of simulation parameters for static calculations/simulations, quantity takeoffs, and/or work and labor estimates of buildings without the need of explicit creation of the architectural elements. This innovative method increases the level of automation in different calculations/simulations such as thermal, acoustic, static, and quantity takeoffs not only for existing buildings but boosts the calculation/simulation work flows for buildings still in the planning process where designs change very frequently.

If a building model already exists (e.g., an architectural model), then embodiments of the present invention are able to read and convert the information properly and derive a robust calculation/simulation model out of the architectural one. Some embodiments of the present invention include automated scanning, measuring, and pattern recognition devices, which allow the creation of calculation/simulation models in a fully automated manner without creating architectural elements first. Other advantages of the present invention include, but are not limited to: increased stability of calculation/simulation model updates when the corresponding architectural model changes, reduced complexity of calculation/simulation model creation because the rule set is constant per building so the number of simulation parameters does not depend on the number of rooms or even the number of parts in the bounding, improved collaboration between different systems as only the space geometries have to be converted from one system to another one (e.g., additional adapters for walls, slabs, roofs, floor plates, and ceilings are not required), improved portability and re-use as technical parameters can be re-used for other projects where similar materials are used simply by rule export and import into other projects, and the like.

FIG. 1 illustrates a building 106 that is to be modeled and simulated using embodiments of the present disclosure. Although building 106 is depicted in FIG. 1 as a single floor structure, building 106 may include multiple floors, rooms, hallways, and may have a wide range of shape and size. For example, building 106 may include several floors and rooms positioned below or above ground level. In some embodiments, an exterior scanning machine 102 is used to generate an exterior point cloud 104 of the external surfaces of building 106. Each point of exterior point cloud 104 may include a three-dimensional coordinate that corresponds to an actual surface or object positioned on the exterior of building 106. As shown in FIG. 1, in some instances exterior scanning machine 102 may be an autonomous computer-guided vehicle such as a drone configured to fly around building 106 and scan the exterior of building 106. In some instances, the movement of exterior scanning machine 102 is controlled by a user using a handheld operating device (e.g., a smartphone) or a workstation. The scanning functionality of exterior scanning machine 102 may be user-controlled or may be performed automatically when building 106 is in view of exterior scanning machine 102.

In a similar manner, an interior point cloud 114 may be generated by an interior scanning machine 112 by scanning the internal surfaces of building 106. Each point of interior point cloud 114 may include a three-dimensional coordinate that corresponds to an actual surface or object positioned within building 106, such as walls, floors, and ceilings. As shown in FIG. 1, in some instances interior scanning machine 112 may be an autonomous computer-guided vehicle such as a drone configured to travel from room to room. The vehicle may be initialized with a floorplan of building 106, or may be programmed so as to iteratively search through building 106 such that each and every room is scanned. In other embodiments, or in the same embodiments, interior scanning machine 112 may be a mountable device or a self-standing device that may be positioned near the center of a room by a user. For example, a user may position interior scanning machine 112 near the center of a room and then set a delay so that the user may leave the room prior to the room being scanned by interior scanning machine 112. In various embodiments, interior scanning machine 112 and exterior scanning machine 102 may be the same machine or different machines.

Figure 2:
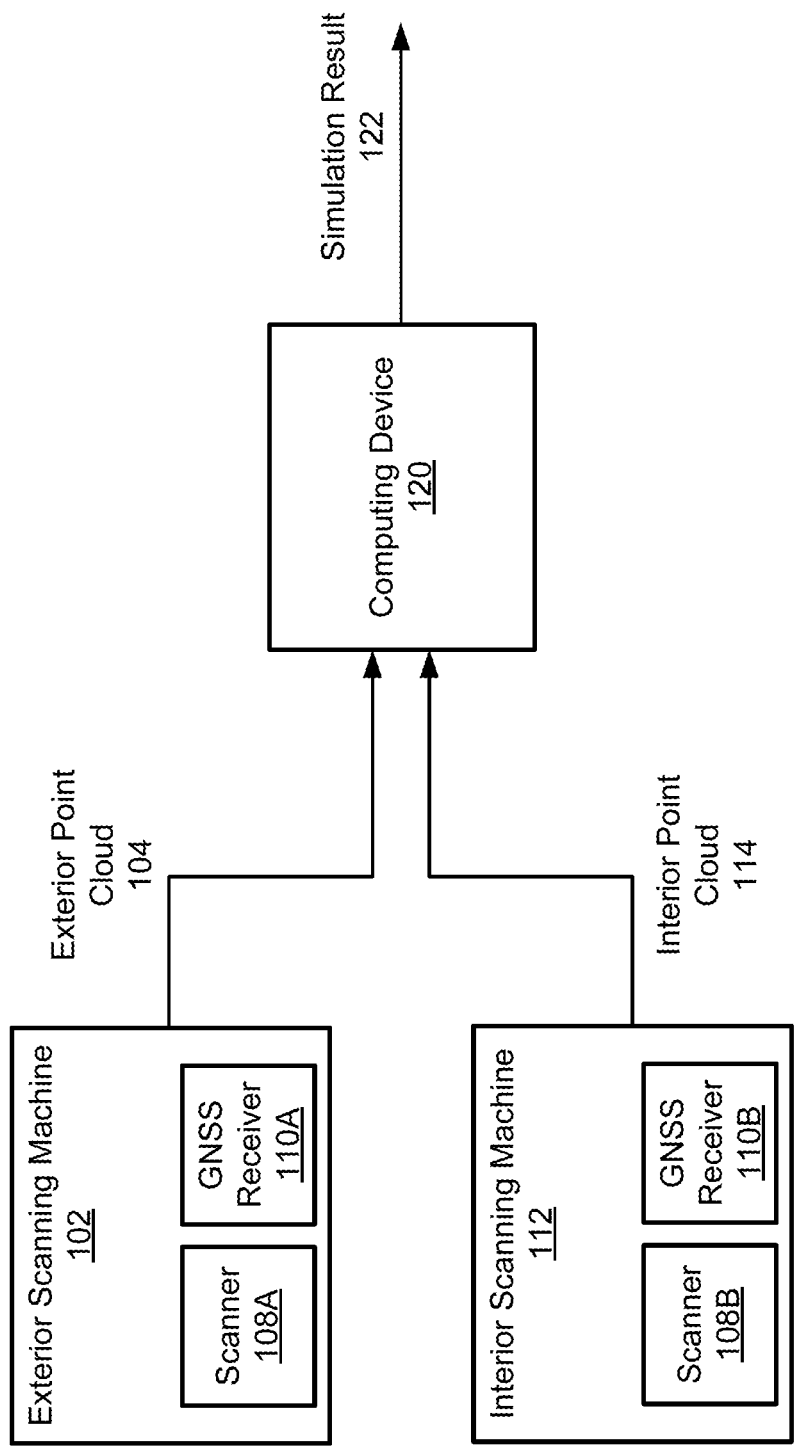
FIG. 2 illustrates a system for detection and simulation of building models, according to some embodiments of the present disclosure.

FIG. 2 illustrates a system 200 for detection and simulation of building models, according to some embodiments of the present disclosure. In some embodiments, both of exterior scanning machine 102 and interior scanning machine 112 may include a scanner 108 and a positioning device such as a global navigation satellite system (GNSS) receiver 110 for generating point clouds. Scanner 108 may employ any number of technologies for detecting depth of surroundings, such as an optical camera, an infrared camera, and the like. In some instances, scanner 108 is capable of determining a distance and a direction between scanner 108 and the point of the point cloud being generated. GNSS receiver 110 may be configured to detect a geospatial position of GNSS receiver 110, which may be used in conjunction with the distances and directions determined by scanner 108 to generate a three-dimensional coordinate for each point of exterior point cloud 104 and interior point cloud 114.

In some embodiments, GNSS receiver 110 may include an antenna for receiving wireless signals and sending/routing a signal related to the wireless signals to a radio-frequency (RF) front end. The antenna may be linearly or circularly polarized, may be mounted or embedded, may be a single antenna or an array antenna, may have a narrow or wide bandwidth, among other possibilities. The RF front end may include a first band-pass filter for initially filtering out undesirable frequency components outside the frequencies of interest, a low-noise amplifier (LNA) for amplifying the received signal, a local oscillator and a mixer for down converting the received signal from RF to intermediate frequencies (IF), a second band-pass filter for removing frequency components outside IF, and an analog-to-digital (A/D) converter for sampling the received signal to generate digital samples.

Digital samples generated by the RF front end may be sent to a receiver processor. In some embodiments, the receiver processor performs one or more correlations on the digital samples using local codes to generate distance estimates between GNSS receiver 110 and various GNSS satellites. In some embodiments, one or more components of the receiver processor (such as, for example, one or more correlators) include specific pieces of hardware, such as an application-specific integrated circuit (ASIC) or a field-programmable gate array (FPGA). In some embodiments, operations performed by the receiver processor are performed entirely in software using digital signal processing (DSP) techniques. After generating the distance estimates, the receiver processor may perform trilateration to generate a position estimate for GNSS receiver 110. After generating at least one position estimate, the receiver processor may output GNSS position data comprising a plurality of GNSS points (i.e., position estimates). Each of the plurality of GNSS points may be a three-dimensional coordinate corresponding to latitude, longitude, and elevation. In other embodiments, the three-dimensional coordinate may correspond to X, Y, and Z positions. The GNSS position data generated by GNSS receiver 110A may be outputted to other system components of exterior scanning machine 102 and the GNSS position data generated by GNSS receiver 110B may be outputted to other system components of interior scanning machine 112.

In some embodiments, system 200 includes a computing device 120 comprising one or more processors and an associated memory. Computing device 120 may receive exterior point cloud 104 from exterior scanning machine 102 and interior point cloud 114 from interior scanning machine 112 via one or more wired and/or wireless connections. Upon receiving exterior point cloud 104 and interior point cloud 114, computing device 120 may generate a building model using the point clouds and may perform a simulation using the building model to generate a simulation result 122.

Figure 3A:
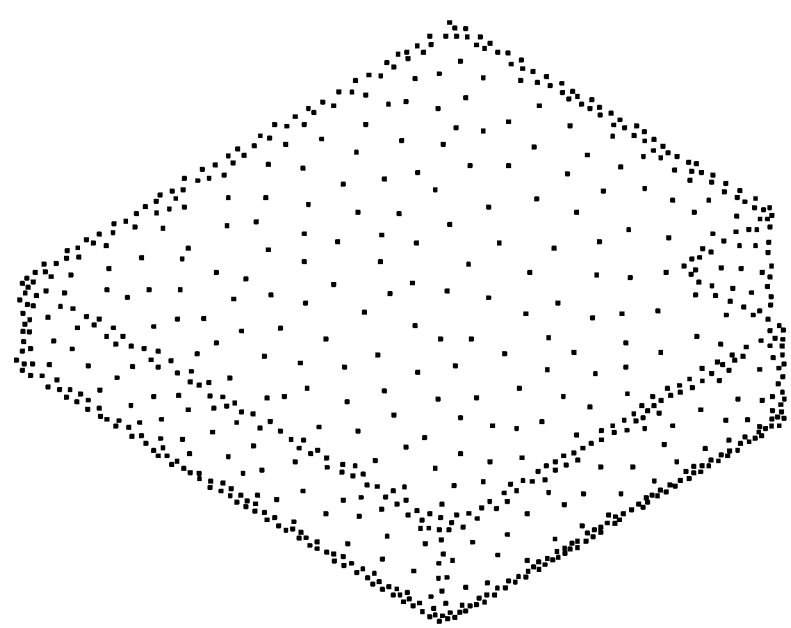
FIGS. 3A and 3B illustrate examples of an exterior point cloud and an interior point cloud generated using an exterior scanning machine and an interior scanning machine, respectively.
Figure 3B:
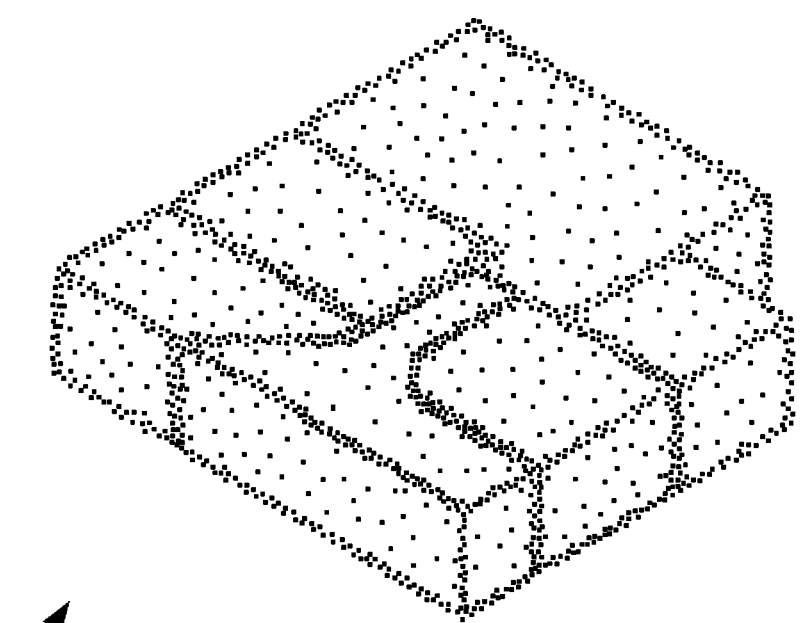

FIGS. 3A and 3B illustrate examples of exterior point cloud 104 and interior point cloud 114 generated using exterior scanning machine 102 and interior scanning machine 112, respectively. The density of points at different locations throughout the point clouds may vary based on the size and shape of building 106 and the position of the scanning machines. For example, in the specific implementation shown in FIGS. 3A and 3B, the density of points is greater along corners and interfaces between different surfaces.

Figure 4A:
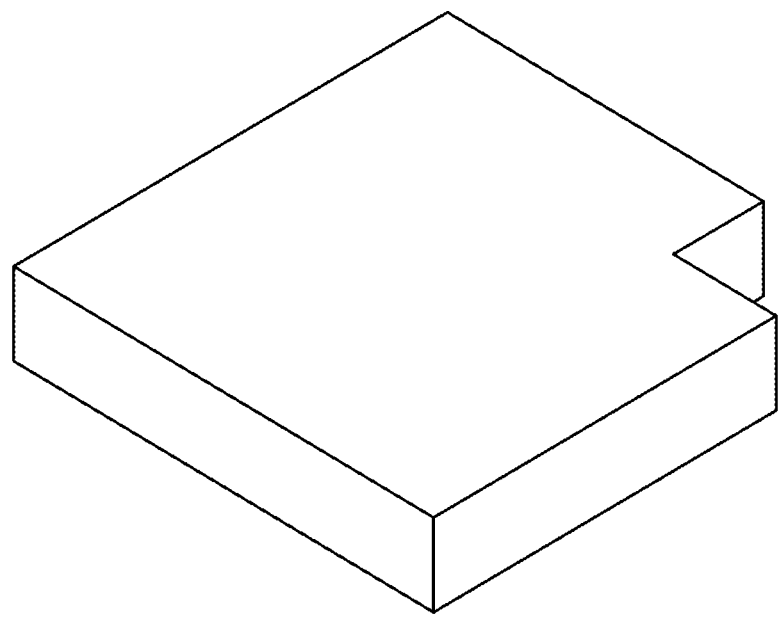
FIGS. 4A and 4B illustrate a plurality of space bodies that are defined by a computing device based on a plurality of point clouds.
Figure 4B:
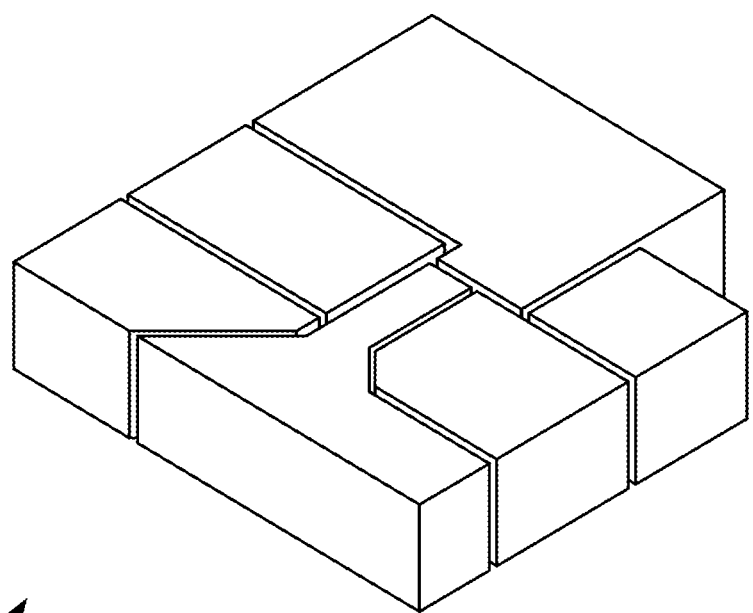

FIGS. 4A and 4B illustrate a plurality of space bodies 140 that are defined by computing device 120 based on the point clouds. Specifically, exterior space body 140A may be defined based on exterior point cloud 104 and interior space bodies 140B may be defined based on interior point cloud 114 using a surface reconstruction technique. In some instances, exterior space body 140A is defined as a shell surrounding building 106. In other embodiments, or in the same embodiments, exterior space body 140A is defined as a volume that extends infinitely in all directions and has an interior cavity whose shape is defined based on exterior point cloud 104. In some embodiments, surface reconstruction is performed by building a network of triangles over the existing vertices of the point clouds. In other embodiments, or in the same embodiments, planar surfaces are constructed by averaging points with respect to a direction (e.g., averaging points with respect to the +x direction may result in a surface formed at x=2). Constructed surfaces may then be joined together to form each of space bodies 140.

In some embodiments, a plurality of gaps between space bodies 140 may be determined after defining space bodies 140 or concurrently with defining space bodies 140. In some embodiments, each of the plurality of gaps may be a line extending between a first and a second space body of space bodies 140. For example, a particular gap of the plurality of gaps may be a line that extends between the two nearest points between a first and a second space body of space bodies 140. In other embodiments, or in the same embodiments, a particular gap of the plurality of gaps may be a line that extends between a randomly sampled point on a first space body of space bodies 140 and a nearest point of a second space body of space bodies 140. In some embodiments, the plurality of gaps may be defined based on average, minimum, maximum, and other distance functions between three-dimensional objects. The number of gaps that are defined may be based on the desired resolution of the simulation.

In some embodiments, each of the plurality of gaps may be a volume between a first and a second space body of space bodies 140. For example, a particular gap of the plurality of gaps may be defined as the volume that is occupied by connecting all points of a first surface of a first space body of space bodies 140 with all points of a first surface of a second space body of space bodies 140. Alternatively, or additionally, a particular gap may be defined as the volume that is encompassed by connecting the edges of a first surface of a first space body of space bodies 140 with a first surface of a second space body of space bodies 140. Accordingly, the plurality of gaps may include more or more lines and/or one or more volumes. In some embodiments, the plurality of gaps may be restricted to be non-overlapping with each other or with any of space bodies 140.

FIG. 5 illustrates a table containing an example of a set of geometric rules 500. As shown, each of geometric rules 500 define simulation parameters (listed in column 508) as a function of the plurality of gaps (listed in columns 502, 504, and 506). Specifically, each of geometric rules 500 define simulation parameters as a function of one or more properties or features of the plurality of gaps. For example, rules 500 may define simulation parameters as a function of gap thickness (listed in column 502), gap angle (listed in column 504), and gap height (listed in column 506). In reference to gap thickness, where a particular gap of the plurality of gaps is defined as a line, the gap thickness may be equal to the length of the line. Furthermore, where a particular gap of the plurality of gaps is defined as a volume, the gap thickness may be equal to the minimum thickness of the volume, the maximum thickness of the volume, the average thickness of the volume, among other possibilities.

In reference to gap angle, where a particular gap of the plurality of gaps is defined as a line, the gap angle may be equal to the minimum angle formed by the line and one or both of the space bodies that the line extends between, or the gap angle may be equal to the angle formed by the line and a predetermined axis (e.g., x-axis), among other possibilities. Furthermore, where a particular gap of the plurality of gaps is defined as a volume, the gap angle may be equal to the angle formed by a vector normal to one of the surfaces of the particular gap and a predetermined direction (e.g., x-axis). For example, the gap angle may be equal to the angle formed by a vector normal to the largest surface (in terms of area) of the particular gap and the x-axis. Alternatively, the gap angle may be equal to the angle formed by a vector parallel to the largest surface of the particular gap and the x-axis. Other possibilities are contemplated.

In reference to gap height, where a particular gap of the plurality of gaps is defined as a line, the gap height may be equal to the vertical distance between ground level and the highest (or lowest or average) point of the line. Alternatively, the gap height may be based on the vertical distance from the base of building 106, from the roof of building 106, or from any other vertical reference point or plane. Furthermore, where a particular gap of the plurality of gaps is defined as a volume, the gap height may be equal to the vertical distance between ground level (or some other vertical reference point or plane) and the highest (or lowest or average) point of the volume. In some embodiments, the gap height may be equal to the vertical distance between the highest point of the volume and the lowest point of the volume. Other possibilities are contemplated.

FIG. 6 illustrates the interaction between a modifying body 602 that overlaps with at least one of space bodies 140 and/or the plurality of gaps. For example, modifying body 602 overlaps at least partially with space bodies 104-1 and 140-3 as well as with the gap defined as the volume between space bodies 104-1 and 140-3. Modifying body 602 may alter the set of geometric rules such that the geometric rules may define simulation parameters as a function of the plurality of gaps and as a function of the modifying body. Use of modifying body 602 may be particularly helpful in situations where two materials having different simulation parameters are similar in size and shape within building 106.

In one particular example, a wooden 10 cm wall might have a different heat transmission parameter than a concrete one with the same thickness. Accordingly, use of modifying body 602 may be used to overlap at least one of the space bodies used to define the gap that includes a concrete wall or to overlap the gap itself. Continuing with the particular example, if a gap has a gap thickness between 20 cm and 22 cm and neither space bodies used to define the gap nor the gap itself overlaps with modifying body 602, then a UValue of 0.7 W/(m$^2$K) may be assigned. Alternatively, if a gap has a gap thickness between 20 cm and 22 cm and at least one of the space bodies used to define the gap or at least a portion of the gap itself overlaps with modifying body 602, then a UValue of 0.7 W/(m$^2$K) may be assigned.

In some embodiments, modifying body 602 may be collapsed into a collapsed modifying body 604 so as to reduce its size. This may be accomplished by only defining modifying body 602 along the surfaces of space bodies 140 or within the gaps defined using space bodies 140. This may have the effect of reducing the data size of modifying body 602, causing simulations to run faster. In some embodiments, different modifying bodies may overlap and the parameter assignment may be based on a logical function of the overlaps, incidences, or containments. As an example, a first portion of gap G that overlaps with modifying body A and modifying body B may be assigned a first parameter, a second portion of gap G that overlaps with modifying body A but not modifying body B may be assigned a second parameter, and a third portion of gap G that overlaps with modifying body B but not modifying body A may be assigned a third parameter.

FIG. 7 illustrates a table containing an example of a set of geometric rules 700. As shown, each of geometric rules 700 define simulation parameters (listed in column 710) as a function of the plurality of gaps (listed in columns 702, 704, and 706) and as a function of modifying body 602 (listed in column 708). Specifically, rules 700 may define simulation parameters as a function of gap thickness (listed in column 702), gap angle (listed in column 704), gap height (listed in column 706), and as a function of whether a particular gap overlaps with a modifying body (listed in column 708). As shown in FIG. 7, whether a particular gap overlaps with modifying body "A" may significantly affect the simulation parameter that is assigned to the particular gap.

Figure 8:
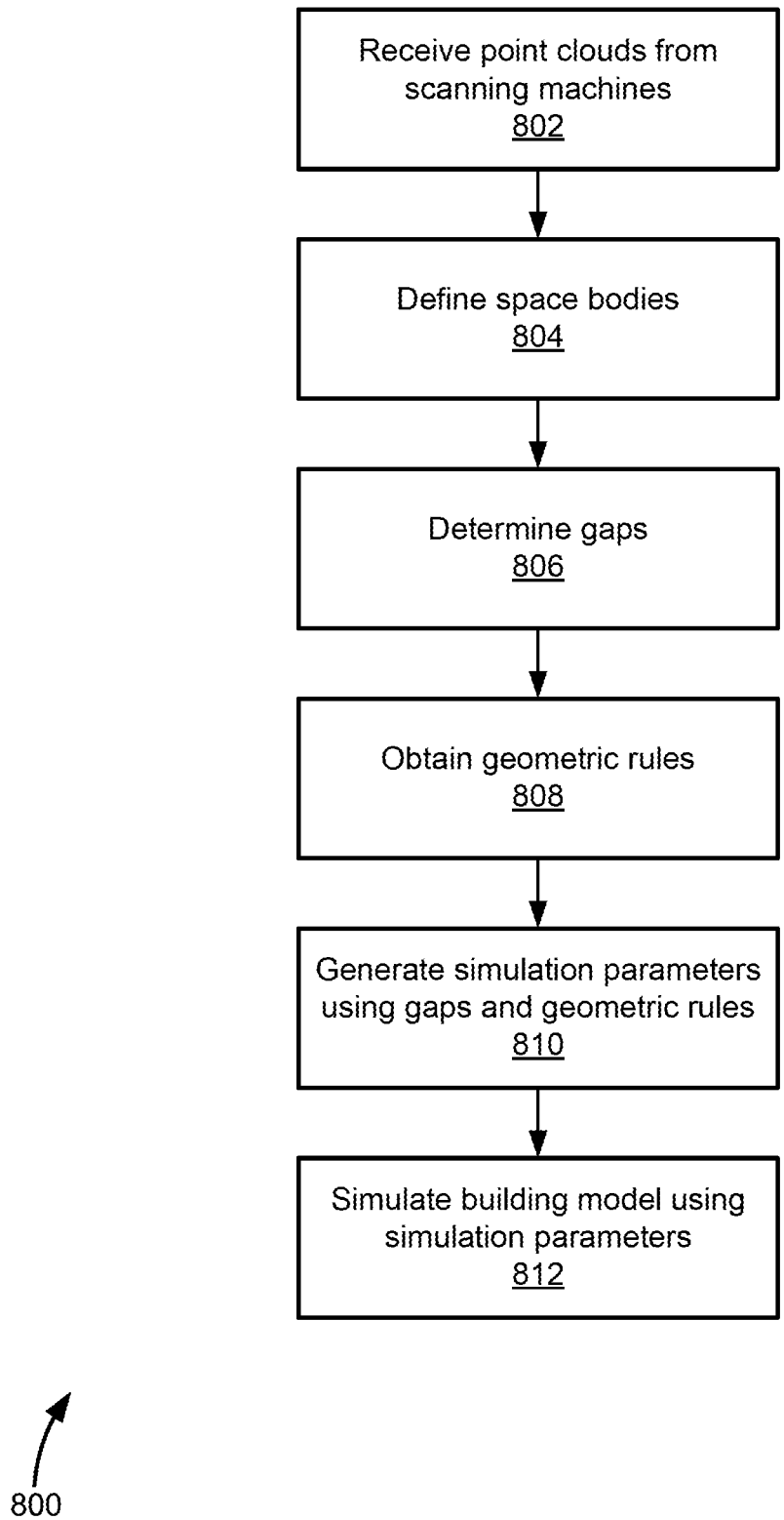
FIG. 8 illustrates a method for automatically simulating a building model.

FIG. 8 illustrates a method 800 for automatically generating and simulating a building model. Steps of method 800 need not be performed in the order shown, and not all steps of method 800 need be performed during performance of method 800. In some embodiments, one or more steps of method 800 may be performed by computing device 120 or by one or more processors within computing device 120. In some embodiments, one or more steps of method 800 may be performed by a supercomputer.

At step 802, an interior point cloud (e.g., interior point cloud 114) is received from a first scanning machine (e.g., interior scanning machine 112) and an exterior point cloud (e.g., exterior point cloud 104) is received from a second scanning machine (e.g., exterior scanning machine 102). Step 802 may be performed immediately after or some threshold amount of time after the interior point cloud is generated by the first scanning machine by scanning at least one room of a building (e.g., building 106) and the exterior point cloud is generated by the second scanning machine by scanning an exterior of the building. In some embodiments, the first scanning machine and the second scanning machine are different scanning machines. In some embodiments, the first scanning machine and the second scanning machine are the same scanning machine.

At step 804, a plurality of space bodies (e.g., space bodies 140) are defined. In some embodiments, the plurality of space bodies are defined using the interior point cloud and/or the exterior point cloud by performing surface reconstruction. One benefit of the present disclosure is that the plurality of space bodies may be defined using the point clouds without any intermediary steps. In other embodiments, or in the same embodiments, the plurality of space bodies are defined using a previously constructed building model (e.g., an architectural model). For example, the previously constructed building model may be analyzed to define the size, shape, and position of each of the plurality of space bodies. Each of the plurality of space bodies may represent a non-overlapping volume within the building. Each of the plurality of space bodies may have a finite number of planar or curved surfaces that enclose the volume. In some instances, a first space body may have a surface that is adjacent but non-overlapping with a surface of a second space body. In some instances, a surface of a first space body may be separated from a surface of a second space body by a gap (or by a plurality of gaps).

At step 806, a plurality of gaps between the plurality of space bodies are determined. One or more of the plurality of gaps may be a line extending between a first and a second space body of the plurality of space bodies, or may be a volume between a first and a second space body of the plurality of space bodies. In some embodiments, the plurality of gaps may include all possible volumes between at least two space bodies. In some embodiments, the plurality of gaps may include a subset of all possible volumes between at least two space bodies. In some embodiments, the plurality of gaps may include a subset of all possible lines extending between two space bodies. For example, a particular gap of the plurality of gaps may be a line that extends between the two nearest points between a first and a second space body of the plurality of space bodies. In other embodiments, or in the same embodiments, a particular gap of the plurality of gaps may be a line that extends between a randomly sampled point on a first space body and a nearest point of a second space body. In some embodiments, the plurality of gaps may comprise each and every line that extend between midpoints of different space bodies of every possible pairing of the plurality of space bodies. In such embodiments, lines that intersect with other space bodies are not included in the plurality of gaps. Furthermore, in such embodiments, a midpoint of a particular space body may be defined as the center-most point (e.g., vertically and horizontally) of the particular space body when viewed from the space body to which it is paired (for gap determination purposes). Other possibilities are contemplated.

At step 808, a set of geometric rules (e.g., rules 500 or rules 700) are obtained. The set of geometric rules may define simulation parameters as a function of the plurality of gaps. Specifically, each of the set of geometric rules may define simulation parameters as a function of one or more properties or features of the plurality of gaps, such as gap thickness, gap angle, gap height, absolute position of a gap, distance to a particular point or point set, among other possibilities. In some embodiments, the simulation parameters are thermal simulation parameters relating to one or more of heat conduction, heat convection, heat radiation, heat transmission, thermal conductivity, and the like. In some instances, a geometric rule may assign a single simulation parameter (e.g., thermal conductivity=$3\times10^{-2}$ W/(m× K)) to a single gap of the plurality of gaps. In other embodiments, a geometric rule may assign multiple simulation parameters to a single gap or, in some instances, multiple geometric rules may assign simulation parameters to a single gap. In some embodiments, or in the same embodiments, the simulation parameters are acoustic, static, and/or quantity takeoff simulation parameters.

At step 810, a plurality of simulation parameters are generated by evaluating the plurality of gaps against the set of geometric rules. Evaluating a particular gap against the set of geometric rules may include identifying which of the set of geometric rules correspond to the particular gap, i.e., correspond to the properties or features of the particular gap. After identifying which of the set of geometric rules correspond to the particular gap, one or more simulation parameter of the identified geometric rule are generated and assigned to the particular gap. Generated simulation parameters may be stored in the same data storage location as the particular gap to which they are assigned, or generated simulation parameters may be stored in a separate data storage location that contains all of the generated simulation parameters. In some instances, generated simulation parameters are deleted after passage of a threshold amount of time of not being used.

At step 812, the simulation parameters are applied to a sequence of simulation conditions to produce a simulation result (e.g., simulation result 122). In some instances, applying the simulation parameters to the sequence of simulation conditions may include running a simulation, causing a simulation to begin, or sending the simulation parameters and the sequence of simulation conditions to a supercomputer or to some external system for simulation. In some embodiments, applying the simulation parameters to the sequence of simulation conditions may include performing any number of calculations using both the simulation parameters and the sequence of simulation conditions. Applying the simulation parameters to the sequence of simulation conditions may also incorporate the geometries of the plurality of gaps.

In some embodiments, the sequence of simulation conditions may include one or more of: a starting time of the simulation, an ending time of the simulation, a length of the simulation, a subset of the plurality of space bodies to be included in the simulation, a subset of the plurality of gaps to be included in the simulation, among other possibilities. In some embodiments, the sequence of simulation conditions may include a starting condition (e.g., a temperature) for one or more gaps of the plurality of gaps. In some embodiments, the simulation result may be a thermal simulation result, such as a temperature, a temperature gradient, or a heat flux corresponding to one or more gaps or one or more locations within the building. The simulation result may be a single value, multiple values, may be time-dependent, and may be produced in graphical and/or numerical form.

Figure 9:
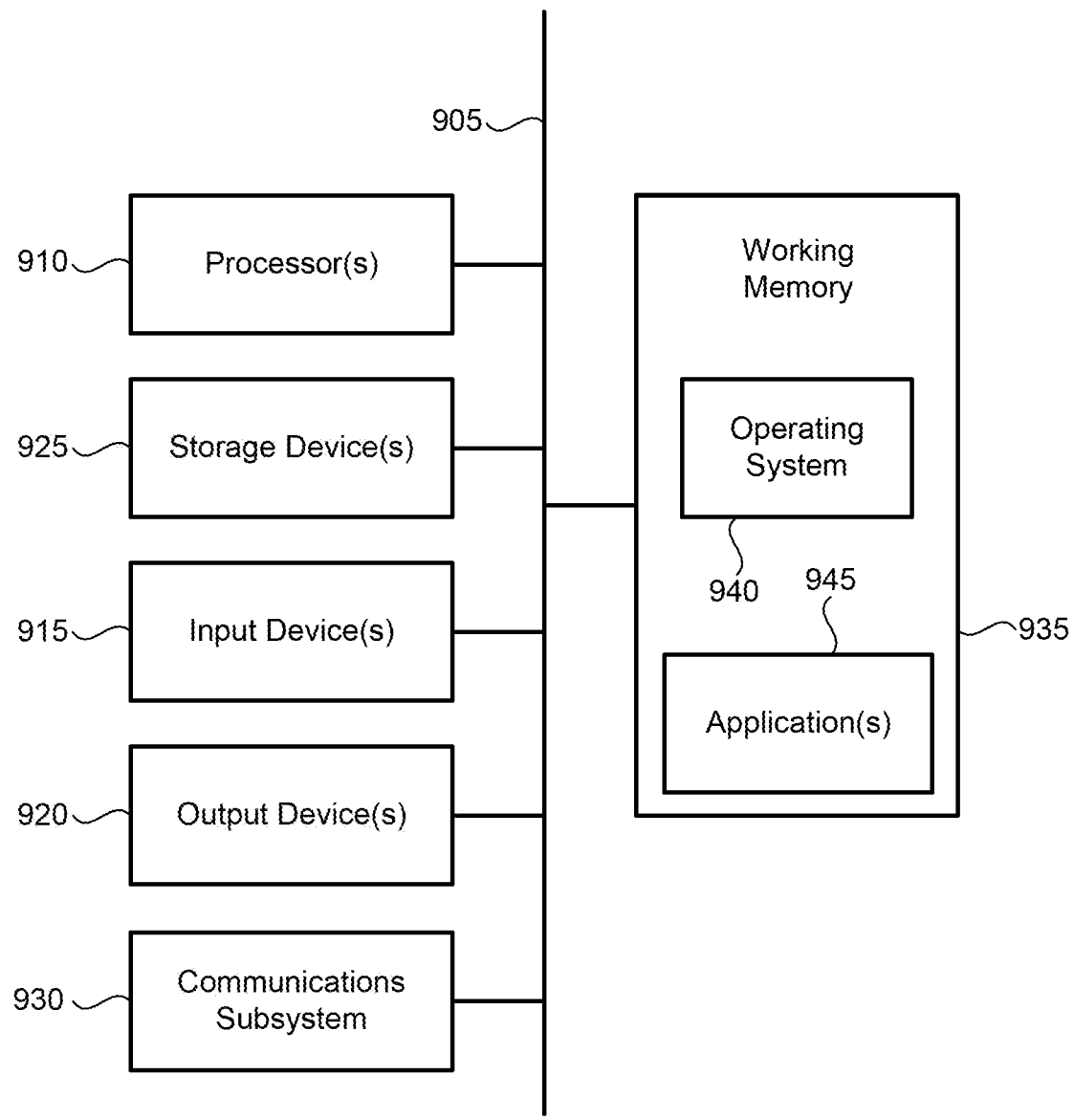
FIG. 9 illustrates a simplified computer system, according to an embodiment of the present disclosure.

FIG. 9 illustrates a simplified computer system, according to an embodiment of the present disclosure. Computer system 900 as illustrated in FIG. 9 may be incorporated into devices such as computing device 120, exterior scanning machine 102, interior scanning machine 112, or some other device described herein. FIG. 9 provides a schematic illustration of one embodiment of a computer system 900 that can perform some or all of the steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or more integrated manner.

Computer system 900 is shown comprising hardware elements that can be electrically coupled via a bus 905, or may otherwise be in communication, as appropriate. The hardware elements may include one or more processors 910, including without limitation one or more general-purpose processors and/or one or more special-purpose processors such as digital signal processing chips, graphics acceleration processors, and/or the like; one or more input devices 915, which can include, without limitation a mouse, a keyboard, a camera, and/or the like; and one or more output devices 920, which can include, without limitation a display device, a printer, and/or the like.

Computer system 900 may further include and/or be in communication with one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 900 might also include a communications subsystem 930, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 930 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 930. In other embodiments, a portable electronic device, e.g. the first electronic device, may be incorporated into Computer system 900, e.g., an electronic device as an input device 915. In some embodiments, Computer system 900 will further comprise a working memory 935, which can include a RAM or ROM device, as described above.

Computer system 900 also can include software elements, shown as being currently located within the working memory 935, including an operating system 940, device drivers, executable libraries, and/or other code, such as one or more application programs 945, which may comprise computer programs provided by various embodiments, and/ or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 925 described above. In some cases, the storage medium might be incorporated within a computer system, such as computer system 900. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by Computer system 900 and/or might take the form of source and/or installable code, which, upon compilation and/or installation on Computer system 900 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as Computer system 900 to perform methods in accordance with various embodiments of the technology. According to a set of embodiments, some or all of the procedures of such methods are performed by Computer system 900 in response to processor 910 executing one or more sequences of one or more instructions, which might be incorporated into the operating system 940 and/or other code, such as an application program 945, contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using Computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by Computer system 900.

The communications subsystem 930 and/or components thereof generally will receive signals, and the bus 905 then might carry the signals and/or the data, instructions, etc. carried by the signals to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for automatically simulating a building model, the method comprising:
    defining a plurality of space bodies, wherein each of the plurality of space bodies represents a non-overlapping volume within a building;
    determining a plurality of gaps between the plurality of space bodies;
    obtaining a set of geometric rules that define different simulation parameters for different gap thicknesses of the plurality of gaps, such that the set of geometric rules define a first simulation parameter for a first range of gap thicknesses and a second simulation parameter different from the first simulation parameter for a second range of gap thicknesses different from the first range of gap thicknesses;
    generating a plurality of simulation parameters by evaluating the plurality of gaps against the set of geometric rules; and
    applying the simulation parameters to a sequence of simulation conditions to produce a simulation result.

2. The method of claim 1, further comprising:
    receiving an interior point cloud from a first scanning machine, the interior point cloud having been generated by the first scanning machine by scanning at least one room of the building; and
    receiving an exterior point cloud from a second scanning machine, the exterior point cloud having been generated by the second scanning machine by scanning an exterior of the building;
    wherein the plurality of space bodies is defined using the interior point cloud and the exterior point cloud.

3. The method of claim 2, wherein the first scanning machine and the second scanning machine are different scanning machines.

4. The method of claim 1, wherein:
    the simulation parameters are thermal simulation parameters; and
    the simulation result is a thermal simulation result.

5. The method of claim 1, further comprising:
    defining a modifying body, wherein the modifying body represents a volume that overlaps with at least one of the plurality of gaps, and wherein the set of geometric rules define the different simulation parameters for the different gap thicknesses based on the modifying body.

6. The method of claim 1, further comprising:
    receiving an existing building model, wherein the plurality of space bodies is defined by analyzing the existing building model.

7. The method of claim 1, wherein the sequence of simulation conditions specify one or more of:
    a starting time of a simulation;
    an ending time of the simulation;
    a length of the simulation;
    a subset of the plurality of space bodies to be included in the simulation; and
    a subset of the plurality of gaps to be included in the simulation.

8. A system for automatically simulating a building model, the system comprising:
    one or more processors; and
    a non-transitory computer-readable medium comprising instructions that, when executed by the one or more processors, cause the one or more processors to perform operations comprising:
        defining a plurality of space bodies, wherein each of the plurality of space bodies represents a non-overlapping volume within a building;
        determining a plurality of gaps between the plurality of space bodies;
        obtaining a set of geometric rules that define different simulation parameters for different gap thicknesses of the plurality of gaps, such that the set of geometric rules define a first simulation parameter for a first range of gap thicknesses and a second simulation parameter different from the first simulation parameter for a second range of gap thicknesses different from the first range of gap thicknesses;
        generating a plurality of simulation parameters by evaluating the plurality of gaps against the set of geometric rules; and
        applying the simulation parameters to a sequence of simulation conditions to produce a simulation result.

9. The system of claim 8, wherein the operations further comprise:
    receiving an interior point cloud from a first scanning machine, the interior point cloud having been generated by the first scanning machine by scanning at least one room of the building; and
    receiving an exterior point cloud from a second scanning machine, the exterior point cloud having been generated by the second scanning machine by scanning an exterior of the building;
    wherein the plurality of space bodies is defined using the interior point cloud and the exterior point cloud.

10. The system of claim 9, wherein the first scanning machine and the second scanning machine are different scanning machines.

11. The system of claim 8, wherein:
    the simulation parameters are thermal simulation parameters; and
    the simulation result is a thermal simulation result.

12. The system of claim 8, wherein the operations further comprise:
    defining a modifying body, wherein the modifying body represents a volume that overlaps with at least one of the plurality of gaps, and wherein the set of geometric rules define the different simulation parameters for the different gap thicknesses based on the modifying body.

13. The system of claim 8, wherein the operations further comprise:
   receiving an existing building model, wherein the plurality of space bodies is defined by analyzing the existing building model.

14. The system of claim 8, wherein the sequence of simulation conditions specify one or more of:
   a starting time of a simulation;
   an ending time of the simulation;
   a length of the simulation;
   a subset of the plurality of space bodies to be included in the simulation; and
   a subset of the plurality of gaps to be included in the simulation.

15. A non-transitory computer-readable medium for automatically simulating a building model, the non-transitory computer-readable medium comprising instructions that, when executed by a processor, cause the processor to perform operations comprising:
   defining a plurality of space bodies, wherein each of the plurality of space bodies represents a non-overlapping volume within a building;
   determining a plurality of gaps between the plurality of space bodies;
   obtaining a set of geometric rules that define different simulation parameters for different gap thicknesses of the plurality of gaps, such that the set of geometric rules define a first simulation parameter for a first range of gap thicknesses and a second simulation parameter different from the first simulation parameter for a second range of gap thicknesses different from the first range of gap thicknesses;
   generating a plurality of simulation parameters by evaluating the plurality of gaps against the set of geometric rules; and
   applying the simulation parameters to a sequence of simulation conditions to produce a simulation result.

16. The non-transitory computer-readable medium of claim 15, wherein the operations further comprise:
   receiving an interior point cloud from a first scanning machine, the interior point cloud having been generated by the first scanning machine by scanning at least one room of the building; and
   receiving an exterior point cloud from a second scanning machine, the exterior point cloud having been generated by the second scanning machine by scanning an exterior of the building;
   wherein the plurality of space bodies is defined using the interior point cloud and the exterior point cloud.

17. The non-transitory computer-readable medium of claim 16, wherein the first scanning machine and the second scanning machine are different scanning machines.

18. The non-transitory computer-readable medium of claim 15, wherein:
   the simulation parameters are thermal simulation parameters; and
   the simulation result is a thermal simulation result.

19. The non-transitory computer-readable medium of claim 15, wherein the operations further comprise:
   defining a modifying body, wherein the modifying body represents a volume that overlaps with at least one of the plurality of gaps, and wherein the set of geometric rules define the different simulation parameters for the different gap thicknesses based on the modifying body.

20. The non-transitory computer-readable medium of claim 15, wherein the operations further comprise:
   receiving an existing building model, wherein the plurality of space bodies is defined by analyzing the existing building model.

* * * * *